United States Patent [19]
Ford

[11] Patent Number: 6,000,714
[45] Date of Patent: *Dec. 14, 1999

[54] STEERING WHEEL ASSEMBLY AND METHOD OF USE

[75] Inventor: Brian C. Ford, Mt. Clemens, Mich.

[73] Assignee: Breed Automotive Technology, Inc., Lakeland, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/947,540

[22] Filed: Oct. 11, 1997

[51] Int. Cl.⁶ .................................................. B60R 21/16
[52] U.S. Cl. ........................................ 280/728.2; 280/731
[58] Field of Search ................................ 280/731, 728.2; 74/552

[56] References Cited

U.S. PATENT DOCUMENTS 5,692,770  12/1997  Scharboneau et al. ................. 280/731
5,768,948   6/1998  Hosoi et al. ........................ 280/728.2

*Primary Examiner*—Paul N. Dickson
*Attorney, Agent, or Firm*—Markell Seitzman

[57] ABSTRACT

A steering wheel/steering shaft assembly (10) comprising: a steering shaft (50) including a shaft portion having a first end (62), the first end including a first securing and aligning mechanism (52) which cooperates with a second securing and aligning mechanism (40) in the steering wheel (13) which clamps upon the first securing and aligning mechanism to orient the steering wheel at a preferred orientation to the shaft and lock same in place.

24 Claims, 8 Drawing Sheets

STEERING WHEEL ASSEMBLY AND METHOD OF USE

BACKGROUND AND SUMMARY OF THE INVENTION

The present invention generally relates to steering wheels and steering shafts, and more particularly to an apparatus and method by which the steering wheel is attached to the steering shaft.

The typical steering wheel includes a rim and spokes which extend between a hub and the rim. The hub includes a splined bore which is press fit upon complementary splines formed at the end of the steering shaft. The end of the steering shaft is also threaded. After the steering wheel is properly aligned to the steering shaft it is pushed onto the end of the shaft with the end passing through the hub. A nut is screwed upon the splined/threaded end of the steering shaft. The above mounting procedure is possible since the upper side of the hub is accessible. Thereafter an air bag module, typically comprising a housing, inflator, air bag and cover, is secured to the upper side of the hub covering the nut. Other steering wheel/steering shaft attachment methods include inserting a threaded bolt into a threaded bore in the steering shaft with a key provided in the shaft and steering wheel to achieve proper alignment.

It has been proposed to replace the conventional steering wheel with an integrated steering wheel. The integrated steering wheel comprises an armature or metal core covered by a styled molded layer which covers the wheel spokes and wheel rim and also forms an air bag module cover. The air bag and air bag inflator are integrated within the steering wheel and situated between the integrally formed cover and the hub. The integrated steering wheel may also include a conventional steering wheel and a conventional air bag module comprising an air bag, inflator and cover. The steering wheel is attached to the steering shaft before the air bag module is secured to the hub of the steering wheel. Thereafter this integrated assembly is attached to the end of the steering shaft. As can be appreciated, it is no longer possible to attach the steering wheel to the steering shaft as described above, since access to the end of the steering (which extends into and through the hub) is now precluded. Consequently, new methodologies of attaching this integrated steering wheel/air bag assembly must be defined.

Since access to the front side of the steering wheel would no longer be available any attachment device will be located on the rear (or bottom) of the hub of the steering wheel. As can also be appreciated, with this attachment device located on the bottom of the hub, the assembly of the steering wheel to the steering shaft is a "blind" operation. As such, the assembly techniques must accommodate this type of operation.

In the assembly of any mating parts, there will be rotational and linear tolerances associated with both parts. It is an object of the present invention to provide an attachment system which accounts for these various tolerances.

It is a further object of the present invention to provide a clamping or gripping type of mechanism to connect the steering wheel and steering shaft.

The present invention comprises a specially shaped steering column and a gripping mechanism located on the back of a steering wheel. The top of the steering shaft contains a rectangular shaped section with a groove located in its center (or alternatively two spaced rectangular sections can be used to defined the groove). Positioned immediately below the rectangular section(s), about the shaft, is a circumferential groove. The gripping mechanism includes a first gripping (or clamping) part which is fixed to the lower side of the steering wheel hub and a slidably mounted second gripping (or clamping) part connected to the first gripping part by a threaded bolt. As will be seen below "gripping" and clamping" are used interchangeably. Each gripping part contains a flat surface which aligns with a corresponding flat side of the rectangular section of the steering shaft as the two clamping parts are moved together. This clamping action simultaneously causes the alignment of the steering wheel to a preferred orientation relative to the steering shaft. The two opposing gripping parts also mate with the circular groove, in the steering shaft, in such a manner as to remove tolerances up and down the shaft. This interconnection axially secures the steering wheel to the steering shaft.

Accordingly, the present invention comprises: a steering wheel/steering shaft assembly comprising: a steering shaft including a shaft portion having a first end, the first end including a first means for aligning and securing a steering wheel thereto. The steering wheel includes a second means, cooperating with the first means, for providing a clamp upon the steering shaft and in cooperation with the first means for causing the self-aligning of the steering wheel to a preferred orientation relative to the steering shaft. More particularly, the steering shaft includes a v-groove and a rectangular projection at its top. The second means includes two relatively movable gripping members, one of which is attached to the bottom of the steering wheel hub, which when in a clamping configuration positions a wedge within the v-groove to positively secure the wheel to the shaft and which engages the rectangular projection to align the steering wheel to a precise orientation relative to the steering shaft and to the passenger compartment.

Many other objects and purposes of the invention will be clear from the following detailed description of the drawings.

DETAILED DESCRIPTION OF THE DRAWINGS

Figure 1:
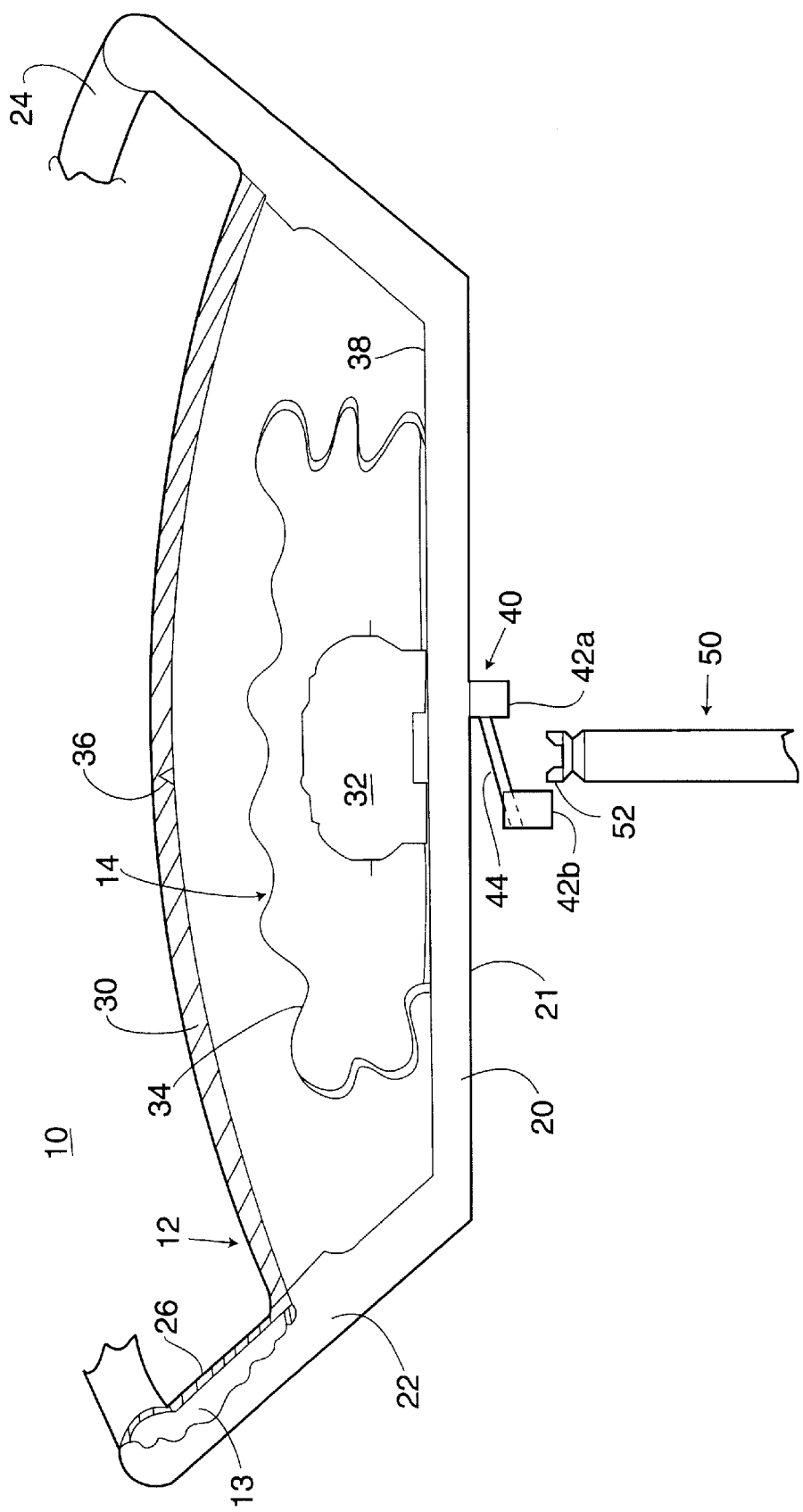
FIG. 1 is a view illustrating the major components of the present invention attached to an integrated steering wheel.

FIG. 1 illustrates the major components of a steering wheel attachment system 10. These components comprise a steering wheel assembly 12, a fastening mechanism 40 and a steering shaft 50. The assembly 12 comprises a steering wheel 13 and an air bag module 14 integrated within or attached to the steering wheel 13. The steering wheel 13 further includes a hub 20, a plurality of spokes 22 and a rim 24. The exterior of the rim is covered with a decorative skin 26 such as leather or plastic. In an integrated steering wheel assembly 12 the cover 30 of the air bag module may be made as a continuous extension of the skin 26. Typically associated with air bag modules is an inflator 32 attached to the hub 20 and an air bag 34 which inflates through the cover 30 which will typically be constructed with a tear seam or tear seams 36 to permit the easy opening of the cover and the egress of the air bag upon activation of the inflator 32. As can be seen from FIG. 1 the upper or front side 38 of the hub 20 is now inaccessible. In the context of the present invention the integrated steering wheel assembly 12 also includes those steering wheel assemblies which utilize a separate air bag module (comprising cover, air bag and inflator) which is attached to the steering wheel 13 prior to the attachment of the steering wheel and air bag module 14 to a steering shaft.

Figure 13:
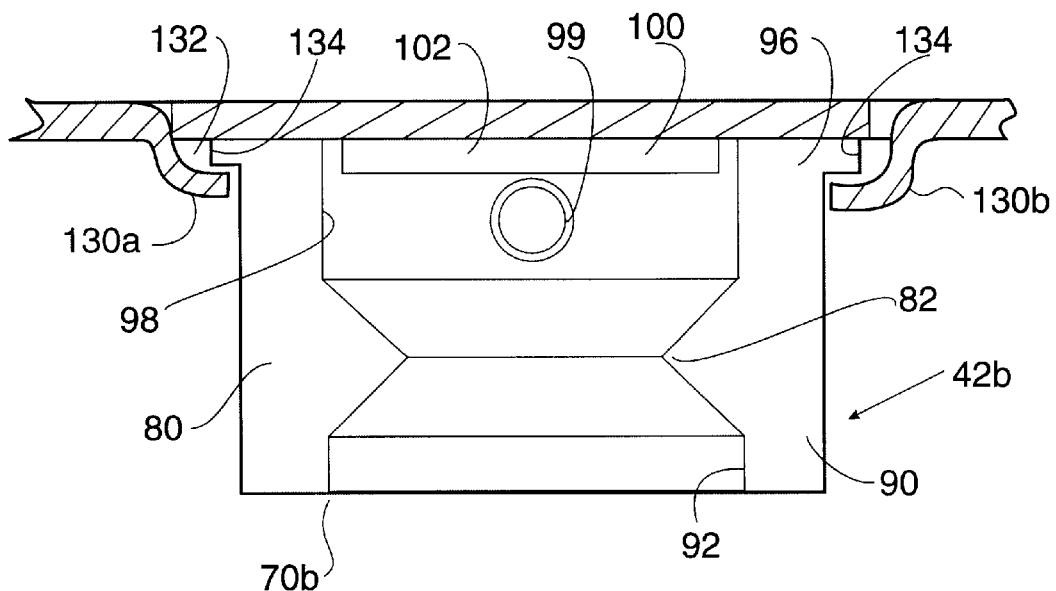
FIG. 13 illustrates an alternate embodiment of the invention in which the second gripping mechanism is slidably retained on a portion of the steering wheel hub.

The fastening mechanism 40 comprises two gripping or clamping mechanisms 42a and 42b. One of these gripping mechanisms such as 42a is attached to the bottom side 21 of the hub or attached to the hub via a separate plate or cast into the steering wheel 13. As will be seen from the description below the second locking mechanism 42b is loosely and slidably positioned (shown below the hub) relative to the first gripping mechanism 42a (as well as the bottom of the hub) by use of a threaded bolt 44 which when rotated draws both gripping mechanisms 42a, 42b into clamping engagement with the portion of the steering shaft 50. If it is undesirable to use a second gripping mechanism that is loosely positioned relative to the bottom of the hub, the hub can be constructed with a guide slot or track to guide the second gripping mechanism 42b into position relative to the first gripping mechanism 42a as shown in FIG. 13. The above mentioned grooves can be constructed by stamping out two parallel flanges 130a,b in the hub 20. These flanges extend perpendicular to the fixed gripping mechanism 42a and define a channel 132 in which the second gripping mechanism slides into clamping engagement with first gripping mechanism. The top of the second gripping mechanism 42b is modified to include a flange 134 which engages and slides upon flanges 130a,b.

Figure 4:
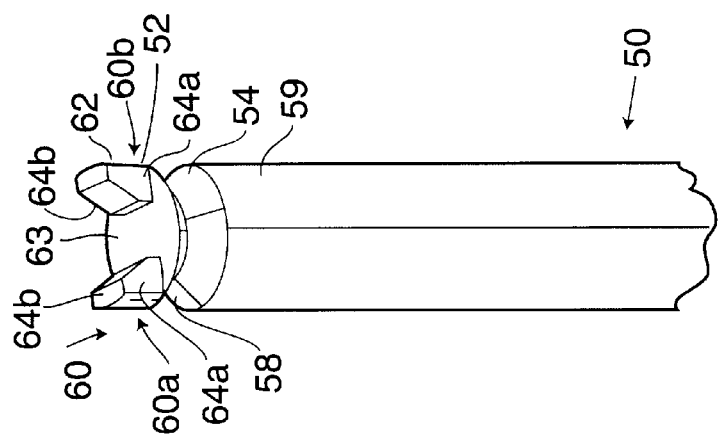
FIG. 4 illustrates an isolated isometric view of the steering shaft showing a locking and alignment mechanism.
Figure 3:
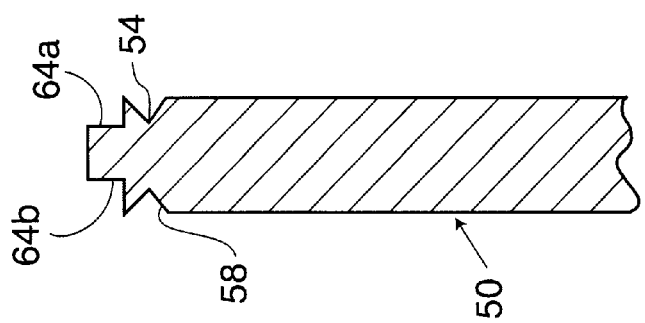
FIGS. 2 and 3 illustrate two different cross-sectional views of a steering shaft.
Figure 2:
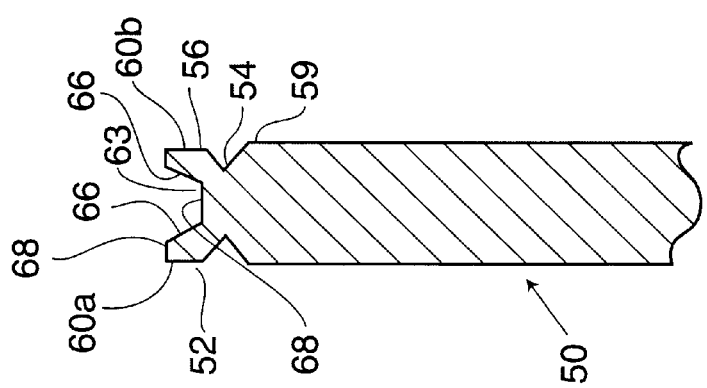

The steering wheel 50, as further shown in FIGS. 2–4, includes a locking and aligning formation 52 which cooperates with locking and aligning formations (102, 102a) constructed into each of the gripping mechanisms 42a and 42b. The locking and aligning formation 52 comprises a circumferential, conically-shaped groove 54 having an upper conical surface 56 and a lower conical surface 58. The formation 52 also includes a rectangular tab 60 which is located at the end 62 of the shaft 50. The rectangular tab 60 is fabricated with a groove or bore 63 therein. In the preferred embodiment of the invention the rectangular tab 60 (with a groove therein) is formed by two somewhat rectangular, tapered, spaced tabs or blocks 60a and 60b which are also located on the end 62 of the shaft 50. Each of these tabs 60a and 60b includes a parallel side surface 64a and opposing side surface 64b. Each tab 60a and 60b further includes an inclined surface 66 which tapers toward a flat portion 68 of the shaft 50 forming the groove 63. The top 68 of each tab 60a and 60d is flat.

Figure 5:
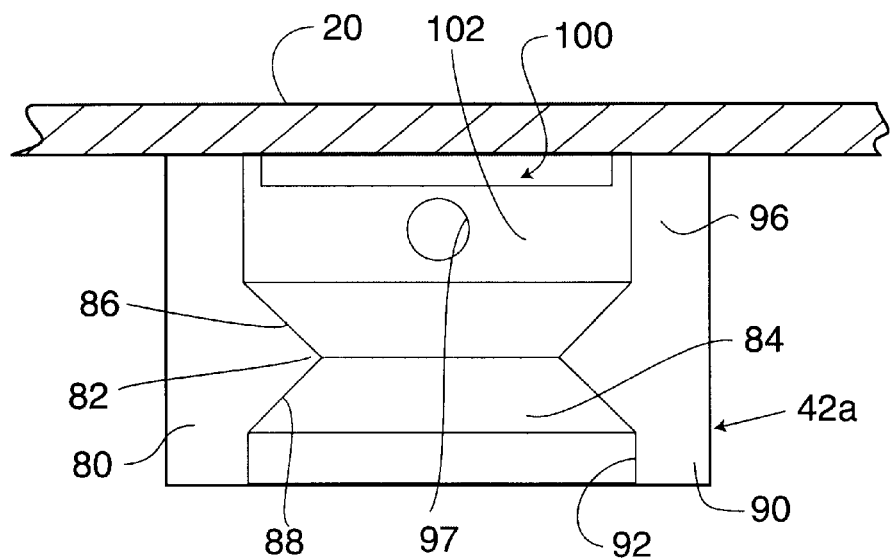
FIG. 5 illustrates a front plan view of a first gripping mechanism.
Figure 6:
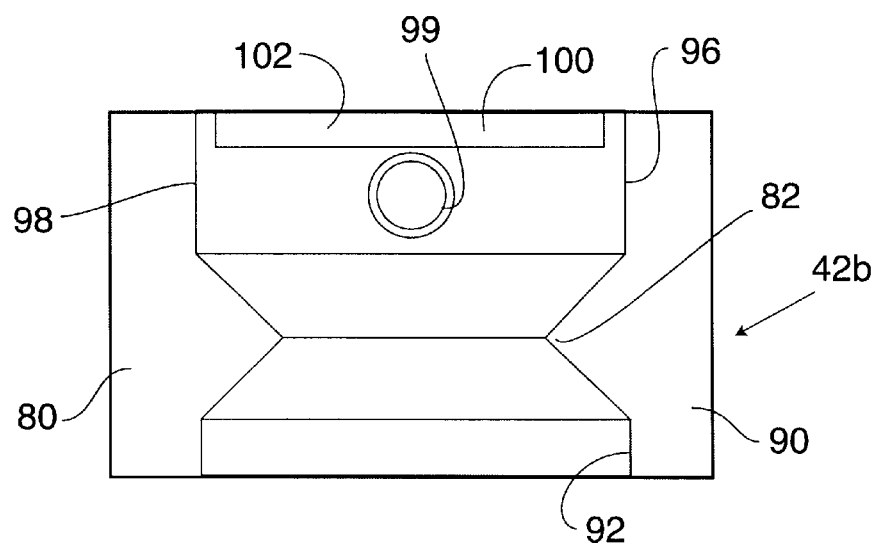
FIG. 6 illustrates a front plan view of a second, cooperating gripping mechanism.
Figure 7:
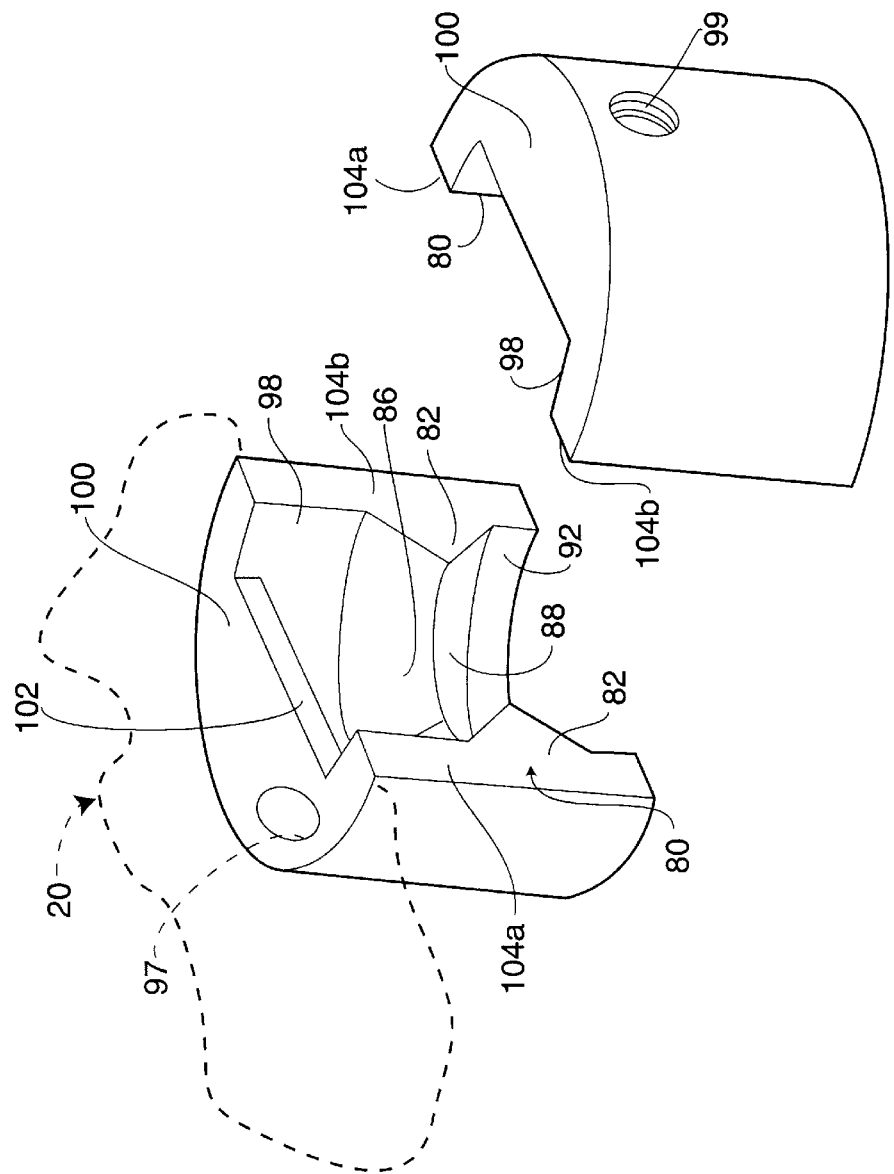
FIG. 7 illustrates an isolated assembly view of two facing, spaced gripping mechanisms.
Figure 14:
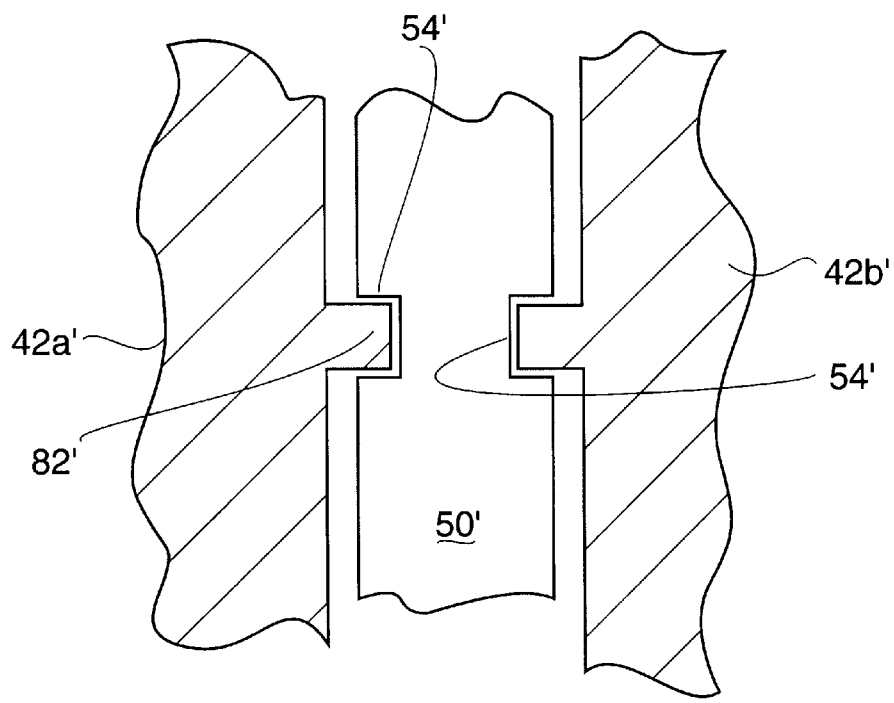
FIG. 14 shows a further embodiment of the invention.

Reference is now made to FIGS. 5–7 which illustrate various views of the gripping or clamping mechanisms 42a and 42b. As can be seen from these figures, each mechanism 42a and 42b is substantially identical. Each of the mechanisms 42a and 42b includes an exterior wall 80 which is formed as a half, hollow cylinder. Situated approximately at the mid point of the wall 80 is a v-shaped wedge 82 which protrudes into a bore 84 formed by the wall 80. As can be seen from FIGS. 5–7, the v-shaped groove includes an upper conically-shaped surface 86 and a lower conically-shaped surface 88 which mate against the corresponding conical surfaces 56 and 58 formed in the shaft 50. In the preferred embodiment of the invention the angle of the v-groove 54 and the angle of the mating wedge 82 is approximately 45°. The 45° angle was chosen to maximize the clamping force against the shaft while permitting the removal of the stack-up of linear tolerance along the steering shaft. This angle could be with the range of 0° to 82°. Reference is briefly made to FIG. 14 which illustrates a modified steering shaft 50' having a zero angle for the wedge 82. In this embodiment the steering shaft 50' includes a flat sided circumferential groove 54'. The v-shaped wedge 82 of each gripping mechanism 42a and 42b (shown as 42'a and 42'b) is now replaced with a flat sided ledge 82' for engagement with the flat groove 54'. Returning to FIGS. 5–7, the lower portion 90 of each wall 80 extends downward from the lower surface of the wedge 82 forming a generally semi-circular opening 92 (which is the lower part of bore 84). As will be seen from the description below, when each of the gripping mechanisms 42a and 42b are mated together the semi-circular openings 92 in each mechanism 42a and 42b form a circular bore which surrounds the exterior wall 59 of the shaft 50. The upper portion 96 of each wall 80 extends upwardly from the upper conical surface 86 forming a semi-circular bore 98 (which is the upper part of bore 84). The top 96 of each wall 80 includes an extending plate 100 which partially encloses a portion of the semi-circular bore 98. As can be seen more clearly in FIG. 7, this extending plate 100 only extends across a portion of the end of the bore 98. The top plate 100 of mechanism 42a is secured to or formed as a part of the steering wheel hub 20. The extending plate 100 is formed with a flat engagement or mating surface 102 which is recessed behind the front, mating surfaces 104a and 104b of the wall 80. As can be seen from the figures, the second locking element 42b similarly includes most of the above elements including the wall 80, wedge 82, bores 92 and 98, extending plate portion 100, flat surface 102 and frontal mating surfaces 104a and 104b. The first gripping mechanism 42a further includes a smooth bore 97 through which a portion of the threaded fastener is received. Additionally, the slidable gripping mechanism 42b includes a threaded bore 99 which receives a threaded portion 45 of the threaded fastener 44. As can be appreciated, when the gripping mechanism 42a and 42b are in their clamping configuration, the wedges 82 engage the v-groove 54 positively locking the steering wheel to the steering shaft in an axial (up-down) direction.

Figure 8:
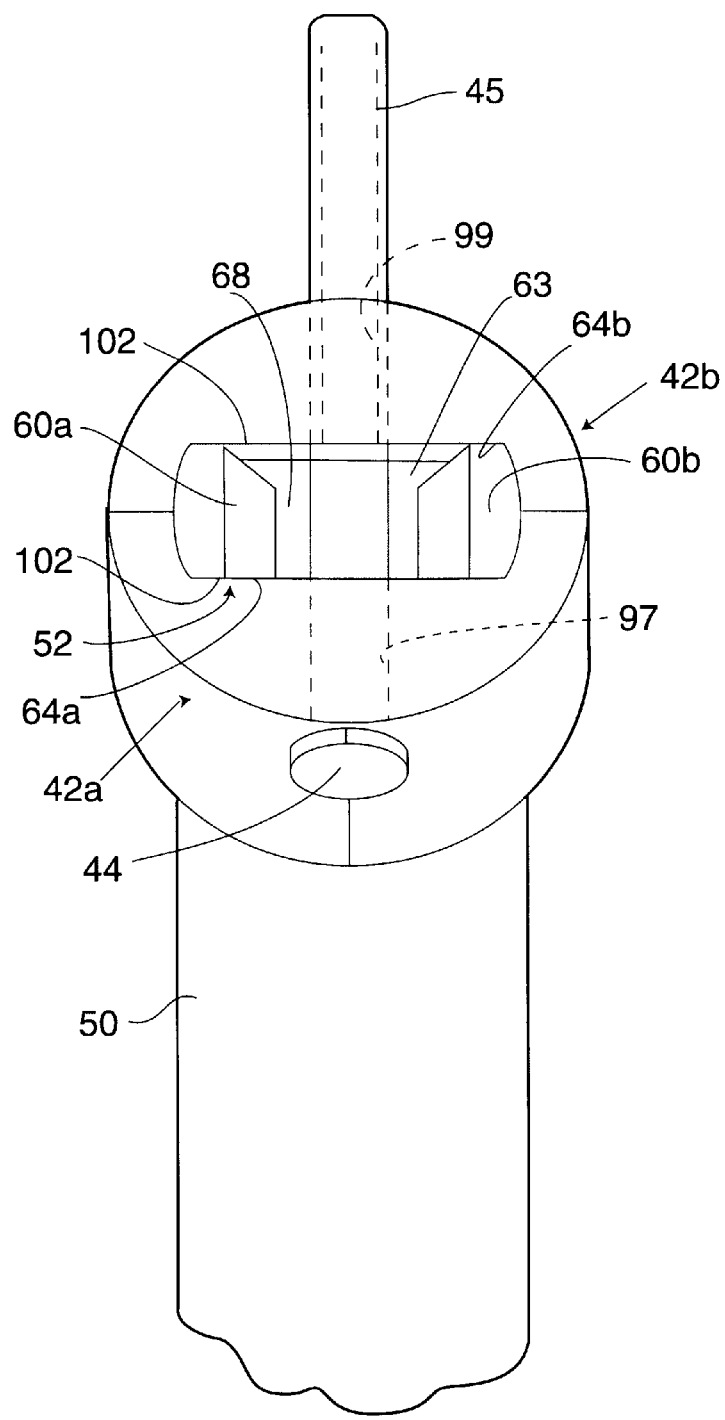
FIG. 8 illustrates an isolated isometric view of the two assembled gripping mechanisms secured about a mating portion of a steering shaft.

Reference is briefly made to FIG. 8 which illustrates the assembled orientation between the two locking mechanisms 42a and 42b and the locking and aligning formation 52 of the steering shaft 50. As can be appreciated the connection between the fixed gripping mechanism 42a and the steering wheel hub 20 has been removed for the purpose of clarity. The movable gripping mechanism 42b has been drawn toward the first gripping mechanism 42b capturing the generally rectangularly-shaped tabs 60a and 60b and aligning the flat side surfaces 64a and 64b to the flat surfaces 102 on each of the gripping mechanisms 42a and b. Further, when the two gripping mechanisms 42a and 42b are positioned together, the recessed plates 100 form a generally rectangular space 110 into which single tab 60 or the two extending tabs 60a and 60b are received. Additionally, FIG. 8 illustrates the orientation of the fastener 44 which extends from the first locking mechanism 42a through the recess 63 formed between the two tabs 60a and 60b and through the second locking mechanism 42b.

Figure 9:
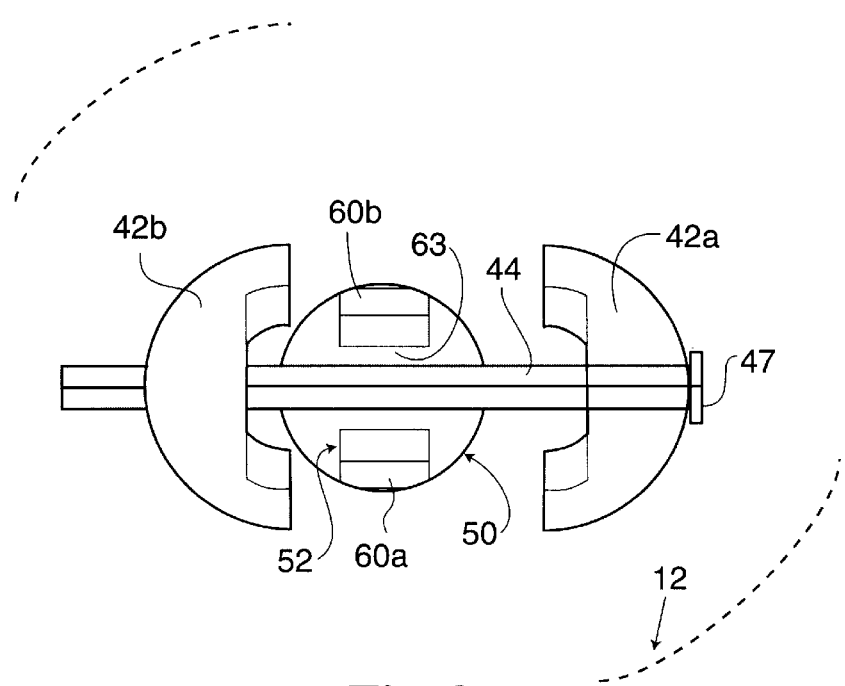
FIG. 9 illustrates a partial assembly view illustrating two clamping mechanisms positioned apart from a portion of the steering shaft.

Reference is made to FIG. 9 which is a top view through the steering assembly 12 (shown in phantom line). Prior to assembly of the steering wheel assembly 12 to the shaft 50, the second gripping mechanism 42b is loosely attached to the first gripping mechanism 42a by threading the fastener 44 into the second gripping mechanism 42b and is positioned below the hub 20 in the orientation shown in FIG. 1. In this condition, a spacing is maintained between the first and second gripping mechanisms which is sufficiently large to permit these gripping mechanisms to be placed generally about the formation 52 on the shaft 50, and more particularly about the tabs 60a and 60b and groove 54.

During the assembly of the vehicle, after the steering shaft is installed (in the vehicle) the alignment and locking formation 52, i.e., the tabs 60a and 60b will be positioned at a known, preferred orientation, which may vary from vehicle to vehicle. FIG. 9 illustrates an exemplary orientation of the tabs 60a and 60b. After the first and second gripping mechanisms 42a and 42b have been attached in the spaced orientation referred to above, the installer positions the steering wheel assembly 12 upon the end 62 of the shaft 50. Subsequently, the installer inserts a screw driver or hex head wrench or some other implement compatible with the formations in the head 47 of the threaded fastener 44 turning the fastener 44 to bring the movable gripping mechanism toward the stationary gripping mechanism 42a, thereby capturing the wedges 82 within the v-shaped groove 54 and clamping the side surfaces 64a and 64b of each tab to the flat engagement surface 102 in each of the clamping mechanisms 42a,42b. Upon tightening of the fastener 44, starting from the orientation shown in FIG. 9, the various parts will achieve a mating orientation as shown in FIG. 8. Even if the second gripping mechanism 42b is initially positioned below the lower surface 21 of the hub 20 proper alignment will be achieved as the conical v-groove 54 and wedge 82 surface engage and permit the second gripping mechanism 42b to slide into place about the steering shaft.

Figure 12:
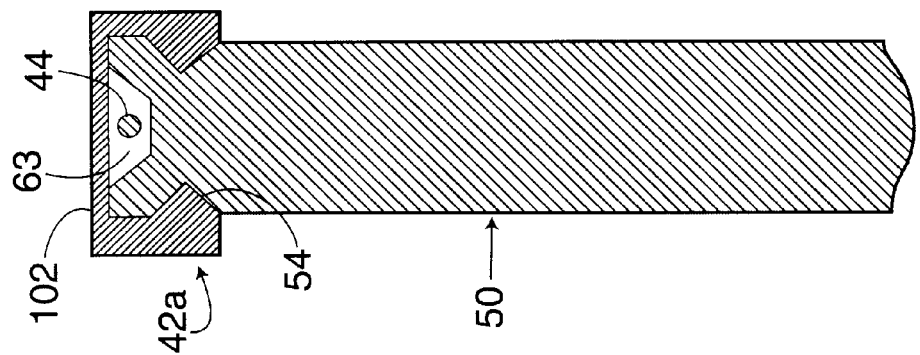
FIG. 12 illustrates a cross-sectional view of the steering shaft and a gripping mechanism in the assembled position.
Figure 11:
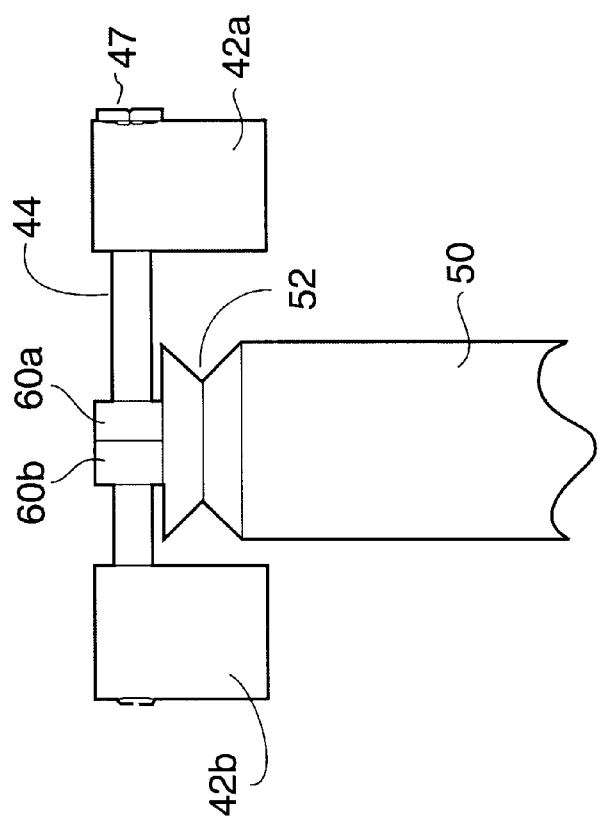
FIG. 11 illustrates a side plan view of some of the components of the present invention.

Reference is briefly made to FIG. 1 and FIG. 11, which is a side plan view showing the relationship between the fastener 44, the shaft 50 and the clamping mechanisms 42a and 42b prior tightening the gripping mechanism FIG. 12 illustrates a side cross-sectional view showing the interrelationship of a clamping mechanism to the shaft.

Figure 10:
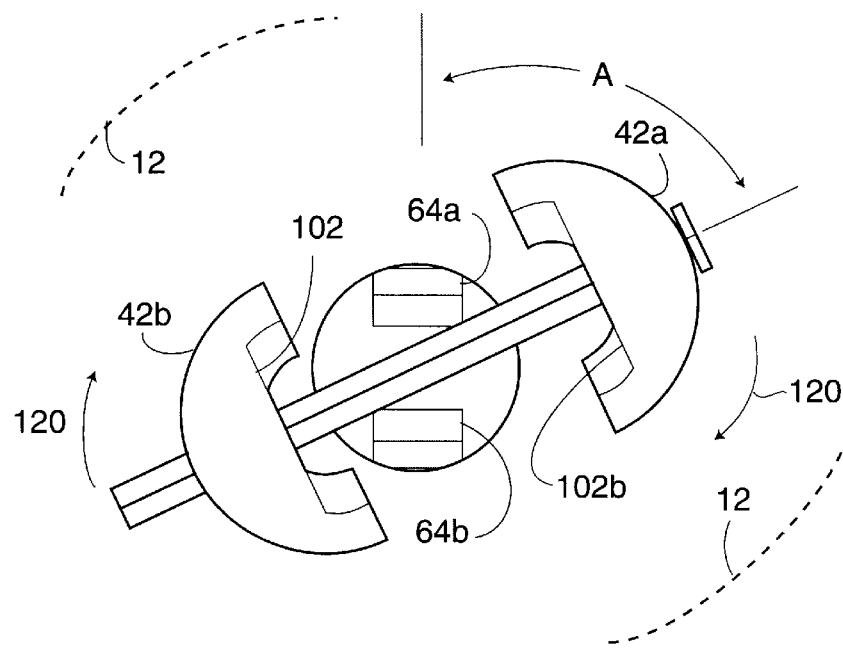
FIG. 10 is a partial assembly view illustrating the two clamping mechanisms of FIG. 9 misaligned relative to the steering shaft.

Reference is briefly made to FIG. 10 which illustrates a further feature of the present invention. One of the advantages of the present invention as compared to the conventional methodology of assembling a steering wheel and steering shaft having a splined or keyed interconnection is that the steering wheel need not be initially mounted upon the steering shaft in the precise, centered orientation as must be achieved when using the splined interconnection. FIG. 10 illustrates the orientation of the shaft 50 which is identical to that shown in FIG. 9. FIG. 10 further illustrates the steering wheel assembly 12 at an arbitrary installation angle which can vary up to +/−39°. Once the steering wheel 13, with its associated mechanisms 42a and 42b, has been loosely positioned about the top 62 of the shaft, the installer then, as before, turns the fastener 44 bringing the sliding clamping mechanism 42b closer to the fixed gripping mechanism 42a. As the two mechanisms 42a and 42b come relatively closer together, the flat engagement surface 102 on the gripping mechanism 42b will initially contact the flat side surface 64b on the tab 64a. Similarly, the flat surface 102b will contact the flat side surface 64a on the opposing tab 60a. As the fastener 44 is further be tightened, to bring the gripping mechanisms closer together, and if the steering wheel 10 is not physically restricted by the installer, forces will be developed between the above-mentioned contacting surfaces which will tend to rotate the steering wheel in the direction of arrows 120 thereby self-aligning the steering wheel 13 to the shaft 50 to achieve the desired physical orientation of that illustrated in FIG. 8.

Many changes and modifications in the above described embodiment of the invention can, of course, be carried out without departing from the scope thereof. Accordingly, that scope is intended to be limited only by the scope of the appended claims.

I claim:

1. A steering wheel/steering shaft assembly (10) comprising:

a steering wheel (12);

a steering shaft (50) including a shaft portion having a first end (62), the first end including first means (52) for cooperating in aligning and securing the steering wheel (13) thereto;

the steering wheel (12) including a second means (40) including a diametrically movable clamp mountable upon the first means and cooperating with the first means for self-aligning the steering wheel to a preferred orientation relative to the steering shaft.

2. A steering wheel/steering shaft assembly (10) comprising:

a steering wheel (12);

a steering shaft (50) including a shaft portion having a first end (62), the first end including first means (52) for cooperating in aligning and securing the steering wheel (13) thereto;

the steering wheel (12) including a second means (40) for providing a clamp upon the first means and in cooperation with the first means for self-aligning the steering wheel to a preferred orientation relative to the steering shaft; the second means including a first gripping mechanism (42a) secured to or integral with the steering wheel and a movable second gripping mechanism (42b);

wherein the first and second gripping mechanisms comprise a half-cylindrical section having one of a projection and complimentary shaped groove therein.

3. The assembly as defined in claim 2 wherein the first means (52) includes a tab (60) having flat side surfaces (64a, 64b) and wherein the second means (40) includes movably disposed, opposing flat surfaces which when moved into a clamping configuration engage the flat side surfaces causing the steering wheel to align to the preferred orientation.

4. The assembly as defined in claim 2 wherein the first means further includes one of a v-shaped groove (54) and a complimentary shaped v-shaped wedge and the second means further includes the other of the complementary shaped v-shaped wedge and v-shaped groove (54), wherein when the second means is moved to a clamping configuration the first and second means move into an axially aligned orientation relative to the steering shaft.

5. The assembly as defined in claim 4 wherein the second means includes a first gripping mechanism 42*a* secured to or integral with the steering wheel and a movable second gripping mechanism (42*b*).

6. The assembly as defined in claim 2 including a threaded fastener connecting the first and second gripping mechanisms, wherein upon rotation of the fastener, the second gripping mechanism is moved closer to the first gripping mechanism (42*a*) into the clamping configuration.

7. The assembly as defined in claim 2 wherein one of the steering wheel and the second gripping mechanisms includes guide means (130, 134) to loosely hold the steering wheel and second gripping mechanism together and permit relative motion therebetween as the second gripping mechanism is moved to a clamping configuration.

8. The assembly as defined in claim 2 wherein each gripping mechanism includes one of flat engagement surfaces.

9. The assembly as defined in claim 2 wherein the projection is a wedge and wherein the groove is a v-groove.

10. A method of securing a steering wheel to a steering shaft, the steering shaft including a shaft portion having a first end (62), the first end including a first means (52) for aligning and securing a steering wheel (13) thereto;

the steering wheel (12) including a second means (40) cooperating with the first means, and including a diametrically movable clamp mountable upon the first means and in cooperation with the first means self-aligning the steering wheel to a preferred orientation to the steering shaft, the method comprising the steps of:
a) positioning the steering wheel over the integral first end with the second means located about the first means;
b) moving the second means into clamping configuration about the steering shaft to affect the diametrically movable clamp.

11. A method of securing a steering wheel to a steering shaft, the steering shaft including a shaft portion having a first end (62), the first end including a first means (52) for aligning and securing a steering wheel (13) thereto; the the steering wheel (12) including a second means (40) cooperating with the first attachment means, for providing a diametric clamp upon the first means and in cooperation with the first means self-aligning the steering wheel to a preferred orientation to the steering shaft, the method comprising the steps of;
a) positioning the steering wheel over the steering shaft with the second means located about the first means;
b) moving the second means into a clamping configuration about the steering shaft to affect the diametric clamp;
wherein the step of moving includes moving two gripping mechanisms, relative to one another, in a direction generally perpendicular to an axis extending through the steering shaft.

12. A steering wheel/steering shaft assembly (10) comprising:
a steering wheel (12);
a steering shaft (50) including a shaft portion having a first end (62);
the steering wheel (12) including movable clamping means (40) for providing diametrically opposing clamping forces generally oriented 180° from each other and directly about the first end to secure the steering wheel to the steering shaft.

13. A steering wheel/steering shaft assembly (10) comprising:
a steering wheel (12);
a steering shaft (50) including a shaft portion having a first end (62);
the steering wheel (12) including clamping means (40) for providing a clamp about the first end to secure the steering wheel to the steering shaft;
wherein the clamping means includes first and second clamping mechanisms, the first and second clamping mechanisms being generally diametrically moveable relatively to one another and to the first end, the first and second clamping mechanisms moveable from a first position, loosely placed about the first end to a second position clamping the first end therebetween.

14. The assembly as defined in claim 13 wherein the first clamping mechanism is secured to the steering wheel and the second clamping mechanism is loosely cantilevered therefrom.

15. The assembly as defined in claim 14 wherein the clamping means includes drawing means for drawing the second clamping mechanism toward the first clamping mechanism to affect the clamp upon the steering shaft.

16. The assembly as defined in claim 15 wherein the drawing means includes an elongated member and wherein the second clamping mechanism is cantilevered from the first clamping mechanism by the drawing means.

17. The assembly as defined in claim 16 wherein the elongated member is a threaded bolt.

18. The assembly as defined in claim 13 including guide and holding means, secured to the steering wheel and spaced from the first clamping mechanism, for slidably holding the second clamping mechanism and for guiding the second clamping mechanism as it is drawn toward the first clamping mechanism.

19. The assembly as defined in claim 14 wherein the clamping means includes drawing means for drawing the second clamping means toward the first clamping means to affect the clamp upon the steering shaft.

20. The assembly as defined in claim 13 wherein the first end includes aligning means for assisting in aligning the steering wheel to a desired angular orientation relative to the steering shaft and the clamping means cooperates with the aligning means to self-align the steering wheel to the desired orientation.

21. The assembly as defined in claim 13 wherein the first end includes a tab (60) having flat side surfaces (64*a*, 64*b*) and wherein the clamping means (40) includes movably disposed, opposing flat surfaces (102, 102*a*) which when moved into a clamping configuration engage the flat side surfaces causing the steering wheel to align to the preferred orientation.

22. The assembly as defined in claim 13 wherein the first end further includes one of a v-shaped groove (54) and a complementary shaped v-shaped wedge and the clamping means further includes the other of the complementary shaped v-shaped wedge and v-shaped groove (54), wherein when the clamping means is moved to a clamping configuration the first and second clamping mechanisms move into an axially aligned orientation relative to the steering shaft.

23. A steering wheel/steering shaft assembly (10) comprising:
a steering shaft (50) including a shaft portion having a first end (62), the first end including first means (52) for Cooperating in aligning and securing a ssteering wheel (13) thereto:

the steering wheel (12) including a second means (40) for providing a clamp upon the first means and in cooperation with the first means for self-aligning the steering wheel to a preferred orientation relative to the steering shaft; the second means including a first gripping mechanism (42a) secured to or integral with the steering wheel and a movable second gripping mechanism (42b);

wherein a threaded fastener (44) connects each gripping mechanism and is used to draw the gripping mechanisms together.

24. The assembly as defined in claim 23 wherein the first means further includes one of a v-shaped groove (54) and a complementary shaped v-shaped wedge and the second means further includes the other of the complementary shaped v-shaped wedge and v-shaped groove (54), wherein when the second means is moved to a clamping configuration the second means moves into an axially aligned orientation relative to the steering shaft.

* * * * *